PATENTED JUNE 12, 1835.
G. M. WEAVER.
SHELLING AND GRINDING CORN.
8893X
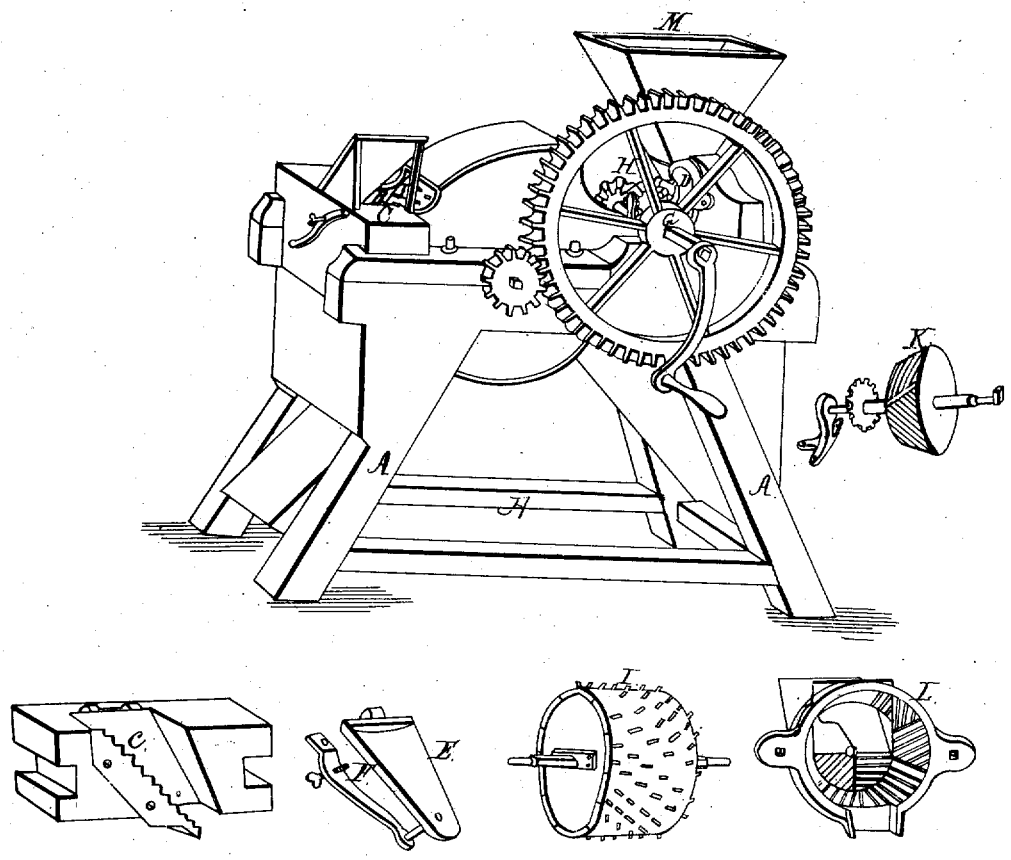
THE NORRIS PETERS CO., PHOTO-LITHO., WASHINGTON, D. C.

88937 June 12. 1835 301.

George M. Weaver of Montgomery. Pennsylvania

Letters Patent.

The Schedule referred to in these Letters Patent and making part of the same containing a descrip-
tion in the words of the said George M. Weaver himself of his improvement in a Machine for shel-
ling and grinding Corn.

To all to whom these presents shall come.

Be it known that I George M. Weaver of Montgomery Square in the County of Montgomery
and State of Pennsylvania have invented a new and useful improvement in a machine for
shelling and grinding corn and that the following is a full and exact description of the con-
struction and operation of the said machine as invented or improved by me.
The machine consists of a supporting frame shelling cylinder. Feeder. Metallic. Grinder screen
discharging shoots gear shaft and gearing. The frame is made of two substantial side pieces of
a breadth and strength sufficient to support the machinery herein after mentioned
having four feet or legs with cross girths or side rails near the bottom also three cross
girths near the top tenoned into the side pieces one of which being much broader than
the rest rises above the top of the side pieces to receive the grinder in its inner face
and the other two lie a short distance below said tops to receive and support the feeder
&c as herein after described. The shelling cylinder is best made of solid wood its
cylindrical surface being covered with about six cast iron plates or sections secured
to the cylinder by screws each armed with five rows of pins more or less (cast with the
plates) ranged in lines at an angle of about 30° with the axis of the cylinder and
spaced so that the pins of each row may range with the blanks of contiguous rows which
precede and follow it. these teeth or pins which are of a broad flat square form
with the outer edges made sharp by a short bevel on the back surface project at
right angles from the cylinder with their broad flat sides foremost or next to the
feeder. A suitable iron shaft passes through the cylinder and has its bearings in
proper boxes on the side rails a short distance in front of their middle point. the
ends of the shaft project through the rails and receive at one end a pinion that mesh-
es with the large cog wheel of the gear shaft, and a small whirl at the other that
drives the rattle shaft of the screen as herein after mentioned. The feeder is made of
a solid block of wood secured to the top of the upper cross girth at the front end
of the frame its inner face being made to conform as near as the teeth will permit
to the front of the cylinder and rising about half its thickness above the top rails of the
frame,

8893X

In its inner face a deep oblique gain or groove is cut called the feed channel. the lower
shoulder of which extends nearly the whole width of the cylinder and descends at an
angle of about 60° with the axis of the latter (that of the rows of pins being 30° more
or less. the gain is also something wider at top than at bottom. the inner face of the block
is covered with heavy sheet iron. the upper edge of which rises a short distance above
the lower shoulder its whole length and is notched or serrated resembling a common
saw except that the teeth have no rake but stand straight up. The lower and
upper shoulders of the channel may also be faced with sheet iron to prevent wear
The bottom of the gain or groove is entirely occupied by the compressor which is made
of a block of wood about one third in thickness of the depth of the gain its inner sur
face or that next the cylinder being concave the better to press and hold the ears of corn
against the cylinder whilst operating it is attached to the feeder block by means of
a hinge at its upper edge which permits it to vibrate to and from the cylinder
which it is made to do by a flat steel spring fastened on the front side of the feeder
block the spring acting on the compressor by means of a pin that passes from the
compressor through the feeder block to the end of the spring the latter is also supplied
with a thumb screw to regulate the degree of pressure. Under the feeder a shoot
is formed by an inclined appron or board running from the lower part of the cylin-
der to the front of the machine and a cap placed against the front legs the object
of which is to discharge the corn when shelled the cob being thrown out at a circular
opening made for that purpose. in the side of the cap next to and a short distance
below the level of the lower or discharging end of the feed channel, to effect which
with more certainty a small wooden strip or guide is made fast to the end of the low-
er shoulder of the feed channel. The feeder is also supplied with a cap open at the
ending side of the machine to prevent the shelled corn from flying out when it is opera-
ting. The gear shaft which is iron lies across the top of the frame immediately behind
the cylinder it runs in metal Boxes placed on top of the frame which raise it
sufficiently high to be on a level with the centre of the grinder it has a small bevel pin
ion near its centre which may be thrown out of gear. which gears to one of the same
size on the shaft of the grinder hereafter mentioned and a large cogwheel on the outer
end that takes into the aforementioned pinion of the shelling cylinder and commu-
nicates a rapid motion thereto. the outer end of the shaft also receive the operating
crank which may be turned by hand or any other power. The grinder is made

8893X of maleable cast iron. the nut is of the form of a short frustrum of a cone the length of which
is about 1/3 the diameter of its base and the diameter of the small end may be about 1/4
less than that of the base or large end which I esteem a good proportion. this nut is
cast solid with an opening at the centre for a square wrought iron shaft. In the
conical surface are cast shallow rectangular furrows six of which run straight across
dividing the conical surface into as many equal parts and the intermediate spa-
ces are divided equally into oblique furrows which run from the straight furrows to the
front circumference of the nut. the front end is divided and furrowed in a similar
manner. the case is cast with its inner surface similarly furrowed and nearly con-
centric with the nut. the difference in the diameter being a fraction in the proportion
less being open at the large end and having an oblong opening at the top contiguous
to the front [illegible] which descends obliquely to the centre of the nut laying bare the up-
per semi circle of the front end of the nut. the lower semi circle of the front end of
the case only being therefore furrowed. by which opening the corn is fed into the nut
[illegible] a hopper of ordinary construction placed over the mill. The case is also cast with
ears having screw holes by which it is screwed to the inner face of the cross piece
heretofore mentioned. behind and as near to the gear shaft as the gearing will permit
At the rear side of the girth a centre screw is introduced which passes through a
suitable nut and being pointed at the end enters the extremity of the shaft of the
nut which is fitted for the purpose and being screwed in or out causes the mill to
grind coarser or finer the front end of the shaft receives a small bevel pinion wheel which
takes into the bevil pinion of the gear shaft and revolves the nut of the grinder.
below the grinder an inclined screen or riddle is placed in a frame which is hinged
to the cross girth already mentioned and covers the top of a discharging shoot
formed by an apron that runs from the girth to the rear of the machine and
and a case placed between the legs of the frame the screen being agitated by the
rattle shaft beneath it geared by a whirl band on its extremity to the whirl on the cyl-
inder shaft already mentioned. the meal falls into a shoot where it is retained by
a slide at the foot. and the husks pass over. Operation. The corn is fed into
the feeder by hand whilst the machine is in revolution. the teeth of the cylinder cause
it to revolve and pass down the channel and being at the same time operated on
by the compressor. the serrated edge completely disengages the corn which falls
into the shoot whilst the cobs slide out at the opening in the side of the case. the

8893X grinder may or may not be put in operation at the same time that the shelling is go-
ing on. when it is designed only to chop the corn the screen or riddle is removed.
I have omitted giving dimensions of the parts in the foregoing description as these
may be varied to suit circumstances. I shall however here give those which I pre-
fer and find to answer practically – length of the frame 2 feet 8 in. Height
of Do 2 ft 8 in. width in clear 9¼ in. diameter of cylinder 13 in. length
and breadth of teeth ½ inch. thickness of do ¼ in. thickness of plates about
3/8 in. diameter of spur wheel 3. in. – do of large cog wheel 16. in. feeder block
4 in square. large diameter of the nut of the grinder 4½ in diameter of the bevel
pinions 2½ in. Now what I claim as new and as my invention for which
I ask Letters Patent is the construction and arrangement of the feeder operating
with the cylinder on the principle and in the manner herein described and also
the construction of the grinder by which it is made to grind on the conical and
front surfaces at the same time, as herein set forth. In testimony that
the foregoing is a true specification of my said improvement I have hereunto
set my hand this 25th day of May 1835

Exd. Witnesses George M Weaver
W.G.C. Sam Stettinius
Isaac Hubber (Drawing) (1834 [illegible])
(Patented 12 June 1835)
Drawing made